United States Patent [19]
Hartnett et al.

[11] Patent Number: 5,334,245
[45] Date of Patent: Aug. 2, 1994

[54] METHOD AND APPARATUS FOR COATING THE TOP OF AN ELECTRICAL DEVICE

[75] Inventors: Mary A. Hartnett; Kimberly J. Sherman, both of Austin, Tex.

[73] Assignee: Microelectronics and Computer Technology Corporation, Austin, Tex.

[21] Appl. No.: 539,259

[22] Filed: Jun. 18, 1990

Related U.S. Application Data

[62] Division of Ser. No. 303,512, Jan. 27, 1989, Pat. No. 5,019,409.

[51] Int. Cl.$^5$ .................... B05C 11/00; B05C 5/02; B05C 3/09
[52] U.S. Cl. .................... 118/59; 118/407; 118/410; 118/415
[58] Field of Search ............. 118/59, 240, 407, 410, 118/415, 706

[56] References Cited
U.S. PATENT DOCUMENTS

| | | |
|---|---|---|
| 4,609,037 | 9/1986 | Wheeler et al. .................... 118/59 |
| 4,721,453 | 1/1988 | Belanger, Jr. .................... 118/415 |
| 4,824,006 | 4/1989 | Shimizu .................... 118/668 |

FOREIGN PATENT DOCUMENTS
8603366  6/1986  World Int. Prop. O.

*Primary Examiner*—W. Gary Jones
*Attorney, Agent, or Firm*—Fulbright & Jaworski

[57] ABSTRACT

A method and apparatus for dispensing a thin coating of a highly viscous encapsulant liquid on to the top surface of a semiconductor device having been inner lead bonded. The coating is dispensed with a controlled thickness and is substantially planar. A liquid encapsulant having optimum thermal, chemical and mechanical properties is selected for protecting the electrical device and which is suitably controlled in an automated liquid dispensed process. The process is directed to various parameters which are required for achieving the desired quality, reliability, and automatic processing capability.

10 Claims, 8 Drawing Sheets

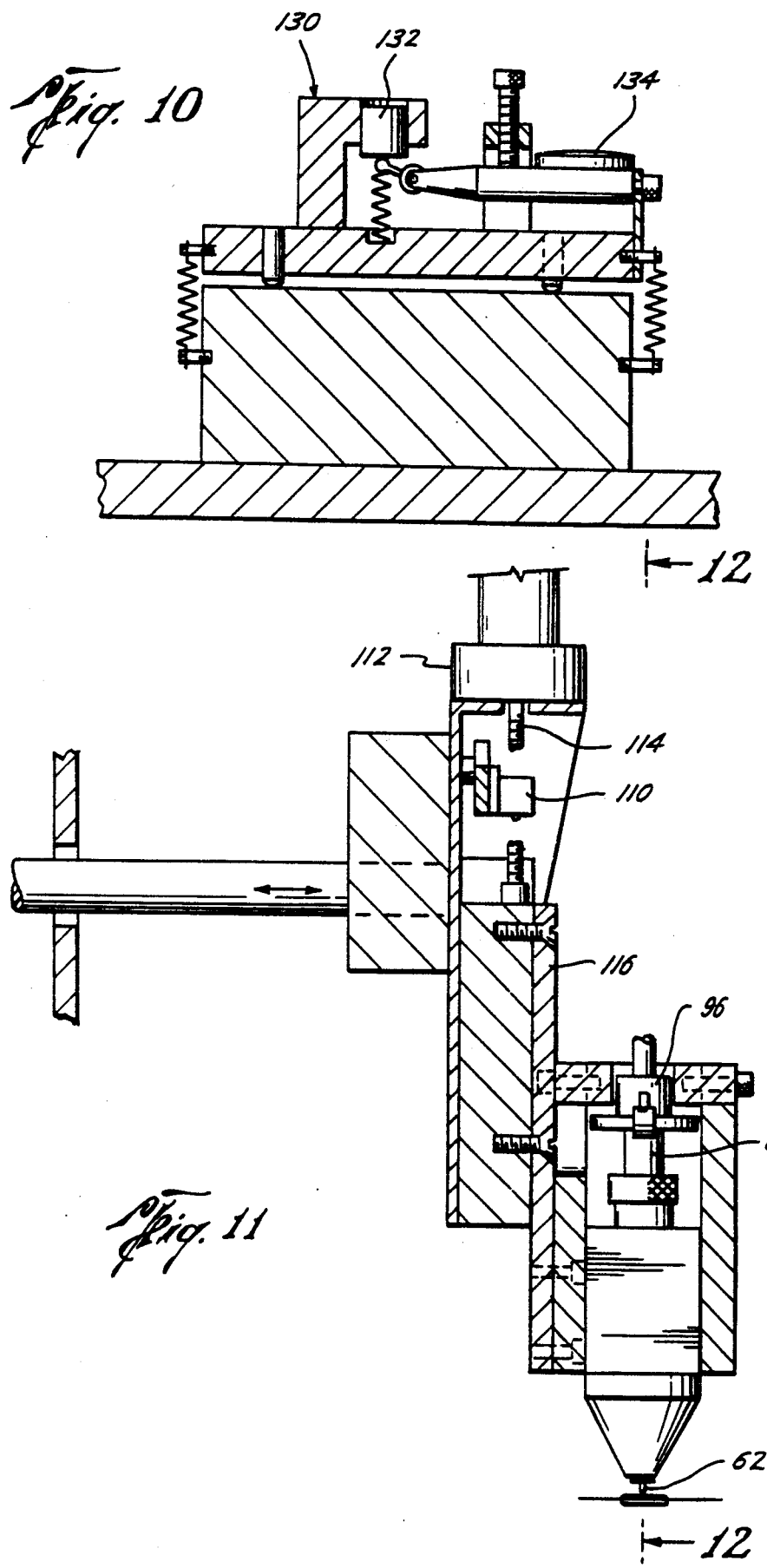

SUMMARY OF BASELINE PROCESS PARAMETER SETTINGS

PROCESS STEP — ACTUAL

PRECLEAN
- OXYGEN PLASMA — 2 MINUTES
- UV OZONE — 1 MINUTES

PREHEAT DRY
- TEMPERATURE — 100 TO 110 °C
- NITROGEN FLOW — 5 LITERS / MINUTE

ENCAPSULANT DISPENSE
- ENCAPSULANT TEMPERATURE — AMBIENT
- BASE PLATE TEMPERATURE — 125 °C
- DISPENSE PRESSURE — *
- DISPENSE PATTERN — SPIRAL, FROM CENTER TO PERIMETER
- PATTERN SPACING — 10 mils
- Z-DISTANCE FROM CHIP — 10 mils
- DISPENSE SPEED RANGE — 0.4 TO 3.33 in/sec
- NEEDLE SIZE — 25 GAGE (10 INCH INNER DIAMETER)
- CYCLE TIME
    - DISPENSE PATTERN — 20 SECONDS
    - MANUAL ADVANCEMENT — 40 SECONDS

GEL
- TEMPERATURE — 120 °C
- NITROGEN FLOW — 5 LITERS / MINUTE
- TIME — > 6 MINUTES

CURE
- CYCLE — 100 °C FOR 2 HRS. + 150 °C FOR ½ HR.
- NITROGEN FLOW — 15 LITERS / MINUTE

Fig. 13

RESULTS OF THE MATRIX 2 EXPERIMENT

| SPACING (mils) | PRESSURE VARIATION (psi) | Z-HEIGHT (mils) | BASE TEMP. (°C) | AVERAGE * THICKNESS (mils) | VISUAL** (rating) |
|---|---|---|---|---|---|
| 6 | −10 | 10 | 125 | 4.2 | 1 |
| 6 | 0 | 6 | 125 | 9.5 | 1 |
| 6 | 0 | 10 | 150 | 9.8 | 0 |
| 6 | 0 | 10 | 100 | 9.4 | 1 |
| 6 | 0 | 14 | 125 | 9.3 | 1 |
| 6 | +10 | 10 | 125 | 14.4 | 1 |
| 10 | −10 | 6 | 125 | 3.3 | 1 |
| 10 | −10 | 10 | 100 | 3.1 | 1 |
| 10 | −10 | 10 | 150 | 2.8 | 1 |
| 10 | −10 | 14 | 125 | 2.3 | 1 |
| 10 | 0 | 6 | 100 | 5.0 | 1 |
| 10 | 0 | 6 | 150 | 5.1 | 1 |
| 10 | 0 | 10 | 125 | 4.8 | 1 |
| 10 | 0 | 10 | 125 | 4.8 | 1 |
| 10 | 0 | 10 | 125 | 5.0 | 1 |
| 10 | 0 | 14 | 100 | 5.4 | 1 |
| 10 | 0 | 14 | 150 | 5.3 | 1 |
| 10 | +10 | 6 | 125 | 7.7 | 1 |
| 10 | +10 | 10 | 100 | 4.2 | 1 |
| 10 | +10 | 10 | 150 | 8.1 | 1 |
| 10 | +10 | 14 | 125 | 7.5 | 1 |
| 14 | −10 | 10 | 125 | 1.7 | 0 |
| 14 | 0 | 6 | 125 | 3.3 | 1 |
| 14 | 0 | 10 | 100 | 3.6 | 1 |
| 14 | 0 | 10 | 150 | 3.4 | 1 |
| 14 | 0 | 14 | 125 | 3.5 | 1 |
| 14 | +10 | 10 | 125 | 5.2 | 1 |

AVERAGE BASELINE PROCESS THICKNESS: 4.8 mils
* ACCEPTABLE THICKNESS: ±2 mils FROM THE AVERAGE BASELINE THICKNESS (2.8 TO 6.8 mils)
** RATING: 0 RATING REPRESENTS INCOMPLETE FLOW BETWEEN PATTERN LINES OR SURFACE PLANARITY > 3 mils;
1 RATING REPRESENTS ACCEPTABLE FLOW AND PLANARITY < 3 mils

Fig. 14

METHOD AND APPARATUS FOR COATING THE TOP OF AN ELECTRICAL DEVICE

This is a division, of application Ser. No. 07/303,512, filed Jan. 27, 1989, now U.S. Pat. No. 5,019,409.

BACKGROUND OF THE INVENTION

The present invention is directed to the provision of a thin coat of encapsulant on the top surface of an electrical device such as a semiconductor chip having bumps on the top of the chip bonded to an electrical interconnect medium such as the inner leads of a tape automated bonded (TAB) tape frame. The purpose of the coating is to provide mechanical scratch protection for the passivation layer of the device, mechanical support for the inner lead bonds, and shielding from gross chemical contamination. Several prior art processes which have been suggested for higher density packaging and replacement of standard molded single chip packages are (1) a "glob" coating of a high viscosity liquid encapsulant or (2) a thin coating of a low viscosity liquid encapsulant, both applied to the top surface of the chip forming a single top coating. A single top coating has the advantage of protecting the chip while allowing for higher density packaging and for direct cooling of the chip through its back side thus not thermally insulating the chip. However, the prior art processes possess many disadvantages. The application of a high viscosity material as a "glob" coating produces a coating which is very thick in the center (typically 20 to 50 mils) and thin at the edges, while the application of low viscosity or solvent cut materials produce a coating which is undesirably thin at the edges and which drips to the back side of the chip. The addition of solvents requires extra processing for removal and may cause bubbling. Both of these processes lack the ability to control the material coverage which result in running, nonplanarity, no shape control, no thickness control, and incomplete surface coverage particularly in the corners. These materials utilized in combination with the lack of dimensional flow control for these processes result in inferior reliability particularly for larger devices due to large thermal stresses induced on the device.

The present invention is directed to encapsulating the top of a chip after inner lead bonding and prior to outer lead bonding and is directed to dispensing a thin coating of a high viscosity liquid encapsulant as a semi-planar, for example, plus or minus 1.5 mils, coating with a controlled average thickness, preferably between 3 and 6 mils. The encapsulant completely covers the entire top surface of the chip including the corners and the area around and beneath the inner lead bonds.

SUMMARY

One feature of the present invention is a process and apparatus which allows dispensing a highly viscous liquid encapsulant, that is, one having a viscosity of greater than 15,000 c.p.s. as a thin semi-planar coating. The viscous encapsulant may be solventless and may contain filler particles. The present process advantageously allows the encapsulant to be dispensed without requiring heating of the encapsulant. Attempts have been made to heat viscous epoxy encapsulants, before glob top dispense (20 to 50 mils thickness), to reduce their viscosity and improve flow; however, heating also significantly reduces the pot life of the material and also results in a difficult process to control. Sometimes solvent has been added to reduce viscosity but this is highly undesirable as it significantly reduces processing time and may cause bubbles or voids when removed. On the other hand, low viscosity liquids have a tendency to run, do not have planarity or shape control, do not provide complete coverage, in particular the corners of the chip, the encapsulant runs to the bottom side of the chip, and typically the thickness is uncontrollable.

Another feature is that the present process allows the use of a highly viscous liquid encapsulant which contains filler particles which improves reliability by reducing thermal expansion and reduces stress in the coating.

Another object of the present invention is the provision of the ability of the present process and apparatus to control the dispensed coating thickness and planarity by controlling important parameters such as the dispense pattern design, spacing, dispense pressure, dispense speed, dispense tip diameter, tip distance from chip, and chip temperature. Tests show that coatings of substantially 15 mils or thicker resulted in degradation of chip reliability due to stress related failures. Thinness and planarity become important for maintaining a low profile for further processing such as face down outer lead bonding.

A still further feature of the present invention is that the apparatus and process allow a complete coverage of the top of the chip and particularly the corners with the encapsulant. Typically, encapsulant, when applied as a thin coating, rounds away from the corners. The present process overcomes this problem by controlling its operating parameters thereby eliminating problems created when using liquid encapsulants.

A further advantage of the present process is the provision of techniques providing a simple quick process setup. The dispense pressure of the encapsulant is dependent upon its viscosity which varies significantly from batch to batch and during storage. A setup procedure allows the required dispense pressure to be determined from a quick dispense test and thus tight control over the viscosity of the encapsulant is not required.

One object of the present invention is the provision of a method of encapsulating the top of an electrical device by heating the electrical device to reduce the viscosity of an applied encapsulant which has an initial viscosity of greater than 15,000 c.p.s. The encapsulant is dispensed in a plurality of separated concentric lines onto the top of the heated electrical device by pressure through a needle while moving the needle relative to the top, and thereafter heating and gelling the liquid encapsulant. The encapsulant may be applied at ambient temperature without heating, may contain a filler, and may be solventless.

Another object of the present invention is wherein the method includes heating the electrical device on a plate having a temperature of substantially 75° C. or greater while dispensing the encapsulant for insuring complete wetting of the surface and flow between the lines of the dispensed encapsulant to provide the desired planarity and coverage.

Another object of the present invention is the provision of a dispense pattern wherein a needle, while dispensing the encapsulant, moves relative to the top of the electrical device in a plurality of equally spaced concentric lines from the center to the perimeter of the top. Other important parameters include: the spacing of the lines of the applied encapsulant substantially equal to the inner diameter of the needle, and in the range of approximately 6 to 14 mils for a 10 mil orifice, for providing planarity, the distance of the bottom end of the needle from the top of the electrical device is no greater than substantially 15 mils for insuring a continuous, uniform dispersal of the encapsulant, and the diameter of the needle is approximately 10 to 20 mils.

Still a further object is wherein the movement of the needle relative to the top stops or dwells at the corners of the top in order to insure complete coverage after gelling.

Still a further object of the present invention is wherein the pressure for dispensing the encapsulant ranges from about 20 psi to about 65 psi and is varied in response to the viscosity of the encapsulant. Preferably, for each new supply of encapsulant, a test is run and the weight of the dispensed encapsulant is measured and thereafter the pressure to be applied to the encapsulant is adjusted as a function of the measured weight.

Yet a further object is the provision wherein the final line around the perimeter of the top is dispensed with the inner diameter of the needle correctly aligned over the outer edge of the top for insuring the full coverage of the perimeter.

Yet a still further object of the present invention is the provision of an apparatus for encapsulating the top of an electrical device in a tape which includes a track for movably carrying the tape. A preheat station is positioned over the track for removing moisture from the device, and an encapsulation dispensing station is downstream from the preheat station. The encapsulation station includes a heater positioned below the track for heating an electrical device placed thereon for reducing the viscosity of dispensed encapsulant, and a pressure actuated epoxy dispenser positioned above the heater and is movable to dispense a liquid epoxy encapsulant in a plurality of separated concentric lines on to the top of an electrical device positioned on the heater. A gel station is positioned downstream from the encapsulation station for heating and solidifying the dispensed epoxy.

Preferably the dispenser is movable relative to the top of the electrical device in a concentric pattern from the center to the perimeter of the top. The speed of movement of the needle increases from the center to the perimeter. Preferably a vacuum suction is connected to the heater for holding an electrical device against the heater.

Yet a still further object of the present invention is the provision of a thin coat ecapsulated TAB chip which includes an electrical integrated circuit chip having a plurality of leads with their inner ends bonded to the top of the chip. A coat of solventless epoxy, initially having a viscosity of greater than 15,000 c.p.s., and having a thickness of less than 15 mils and being substantially planar, is positioned on the top surface of the chip and completely covers the corners and edges of the top. Preferably, the epoxy coating contains a filler and the average thickness of the coating is in the range of about 3 to 6 mils with a planarity of about plus or minus 1.5 mils on the top surface of the chip.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 10 is a cross-sectional view taken along the line 10—10 of FIG. 8, FIG. 11 is a cross-sectional view taken along the line 11—11 of FIG. 12, FIG. 13 is a summary of the baseline parameter settings of the present invention, and FIG. 14 is a table setting forth various variations in some of the parameters.

DESCRIPTION OF THE PREFERRED EMBODIMENTS

Figure 1:
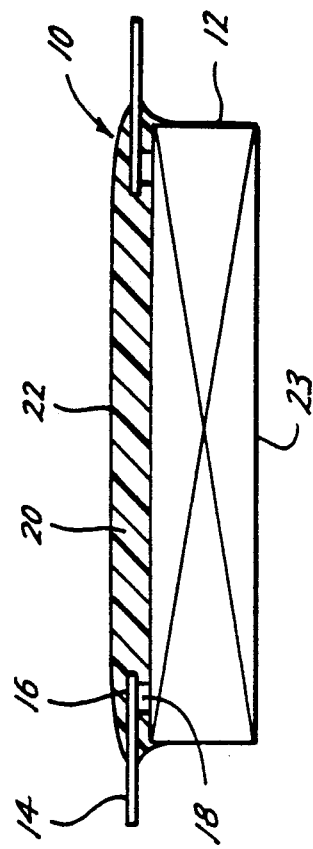
FIG. 1 is an elevational cross-sectional view of the thin chip coat encapsulation of an inner lead bonded device coated by the present apparatus and process.

Turning now to the drawings, and particularly to FIG. 1, the reference numeral 10 generally indicates a conventional electrical device such as a semiconductor chip 12 having a plurality of bumps 18 which are bonded to the inner leads 16 of an electrical interconnect medium, such as a TAB tape frame. The present invention is directed to an apparatus and process to dispense a thin coating of a liquid encapsulant coating 20 onto the top surface of an electrical device such as a chip or a semiconductor 12. The coating 20 covers the passivation layer and the area around and beneath the inner lead bonds. The top 22 of the coating 20 is semi-planar, preferably plus or minus 1.5 mils and has a controlled average thickness, preferably between 3 and 6 mils. The purpose of the coating 20 is to provide mechanical protection for the passivation layer, mechanical support for the inner lead bonds, and shielding from gross chemical contamination. The bottom or back surface 23 of the chip 12 is not coated to allow for direct cooling of the chip, to maintain a low profile to allow for high density bonding of the outer leads of the beam leads 14, and to minimize processing costs by applying a single top coat which does not require further chip packaging.

Various attempts have been made in the past to encapsulate the top of a semiconductor device with coating. First, attempts have been made to apply viscous epoxy encapsulants dispensing a "glob" coating (20 to 50 mils thickness) in the center and covering the chip. Tests indicate that coatings of substantially 15 mils or thicker result in degradation of reliability of large devices due to stress related failures. A glob top coating for larger devices (greater than 62,500 square mils)

results in failures due to cracking of the passivation coating, metal lines, or the chip. Attempts to lower the viscosity and thus produce a thinner coating using the center glob dispense method include heating of the encapsulant and addition of solvents. Heating the encapsulant reduces its pot life and the flow control of coatings dispensed in the center is difficult to control. Adding solvent only creates the additional problem of removing the solvent during the process, and solvent frequently causes other coating defects.

Attempts have been made to provide coating of low viscosity encapsulants, for example silicones or unfilled epoxies, which while producing thin coatings frequently do not provide complete coverage of the chip, or run to the bottom of the chip, frequently wet the bottom of the chip, and are uncontrollable. The use of low viscosity encapsulants generally result in poor reliability when applied to large devices due to large thermal stresses. All types of liquid encapsulants when applied to the top surface of a device typically round away from the corners of the device during cure of the material, resulting in incomplete coverage and protection.

The present process and apparatus allows dispensing a highly viscous solventless liquid encapsulant which may contain filler particles as a thin semi-planar coating. Material possessing viscosities of greater than 15,000 c.p.s. have been dispensed successfully providing a tight control of the dispensed coating thickness and planarity, providing complete coverage of the top of the device including the corners, and the encapsulated chips' reliability was enhanced. The material selected for this thin chip-coat application is a major factor contributing to the final product quality and reliability. Approximately thirty-two materials were evaluated for their mechanical, electrical, chemical and process optimization properties. The majority of these materials were unsatisfactory, but one of the materials was tested and was satisfactory based upon both material properties and environmental test results. This selected material was a silica filled epoxy sold under the trademark Abelbond 69-5 epoxy sold by Ablestik Laboratories which had a viscosity of approximately 50,000–80,000 c.p.s. at ambient temperature. Several other materials were successfully evaluated in terms of processability but were not environmentally tested.

As previously mentioned, the present encapsulation process involves the steps of preclean, preheat, encapsulant dispense, encapsulation gel, and final cure.

Figure 2:
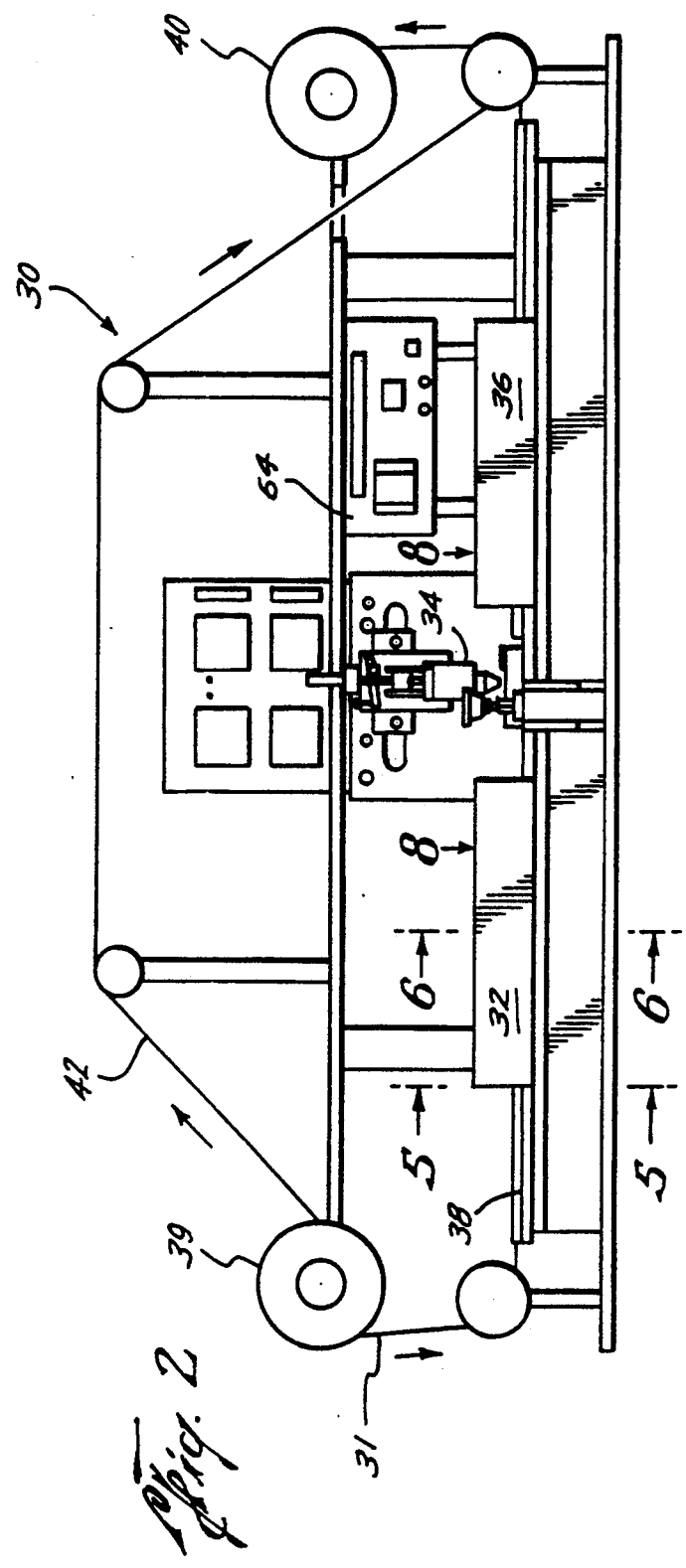
FIG. 2 is an elevational view of the encapsulation system of the present invention.

Referring now to FIG. 2, a lab scale system generally indicated by the reference numeral 30 is shown which includes a preheat station generally indicated by the reference numeral 32, and an encapsulant dispense station generally indicated by the reference numeral 34, a gel station generally indicated by the reference numeral 36, and a reel-to-reel handling track generally indicated by 38. Additional equipment (not shown) required to automate the process would include a preclean unit upstream of the preheat station 32 and a curing oven downstream of the gel station 36.

Encapsulation of a contaminated chip surface could lead to severe reliability problems. The two cleaning techniques employed in the process include plasma etch and UV-ozone. These are conventional systems and the plasma system was purchased from March Corporation and the UV-ozone system was purchased from Uvocs. Both cleaning systems are small batch units. The oxygen plasma unit was utilized for cleaning parts in strip form after the inner lead bonds of the TAB were connected to the chips. The UV-ozone unit was used when higher volumes of devices were encapsulated in reel-to-reel form. Since the batch unit could not be used to clean chips which had been inner lead bonded in reel form, the sawn chips were cleaned in the system after saw, and just prior to ILB. If devices are encapsulated in reel form or on carriers using an automated system, it is recommended that a UV-ozone system be installed in-line in the encapsulation system 30.

The system 30 includes an input reel 39 in which the chips 12 having been inner lead bonded at tape ends 16 to a TAB tape 31, such as 35 mm. which moves through the track 38 to a takeup reel 40 while a conventional interleaver 42 moves from reel 39 to reel 40 simultaneously with the tape 31. The handling track 38 guides the 35 mm. tape with inner leads bonded devices through the stations 32, 34, and 36. In the laboratory system, the tape 31 was manually advanced through the system 30, but the system may be automated if desired.

Referring now to FIGS. 2, 5, 6 and 7, the structure of the preheat station 32 may best be seen. The purpose of the preheat station 32 is to eliminate moisture on the surface of the chip 12 prior to encapsulation. Also, preheating the die 12 reduces the thermal shock experienced by the die when it is subjected to the heated base stage in the encapsulation station 34. The preheat station 32 is a tunnel-like shell which covers the track 38. Heat is supplied by two infrared tubes 44 suspended in the tunnel above the track 38. The tunnel heater 32 rests on the edge of the handling track and is aligned through several dowel pins 46. Nitrogen is introduced into the top center of the heater station 32 through conduit 50 and diffused across plate 48. The tunnel heater is double walled having an outside wall 52 and an inside wall 54 to provide thermal insulation between the heating station 32 and the surrounding atmosphere. Temperature uniformity in the preheat station 32 is not critical and the goal is to maintain a temperature above 105° C. to remove moisture, but below the 125° C. preferred temperature of the heater base stage in station 34.

Referring now to FIGS. 1, 8, 9, 10, 11 and 12, the dispense station 34 is provided to repeatedly dispense a thin coating of encapsulant over the top surface of the chip 12. A thin coat of encapsulant is dispensed by applying pressure to a prefilled, preferably plastic syringe 60 having a needle tip 62 (FIG. 12), which moves across the top surface of the chip 12 in a controlled repeat pattern. The plastic syringe 60 is disposable, eliminating messy cleanups. A micro-processor controls a dispense robot arm (FIG. 11) for movement in the X, Y and Z directions. A Model 104 by BSI Industries, Inc. may be provided to support and control the movement of the syringe 60 and needle 62. The micro-processor includes a program consisting of X, Y and Z coordinates, speed parameters, dwell options, and on and off pressure and vacuum valves.

Various variables control the success of the dispense portion of the process, which will be more fully discussed hereinafter, including dispense needle orifice size, z-height distance, device temperature, dispense pressure, dispense speed, dwell time, initial coordinates, pattern design, which refers to choice of repeating pattern, and the spacing between each line of the pattern.

Figure 8:
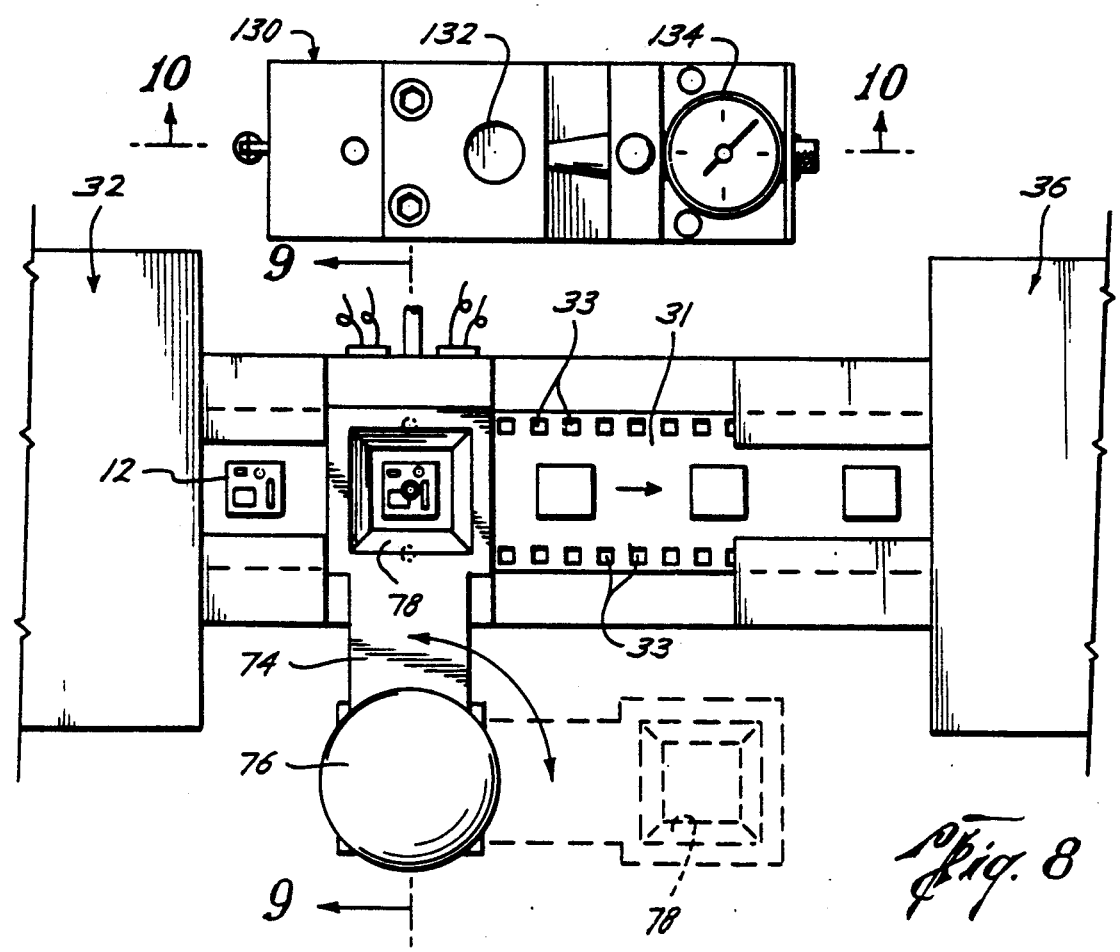
FIG. 8 is an enlarged cross-sectional view taken along the line 8—8 of FIG. 2.
Figure 9:
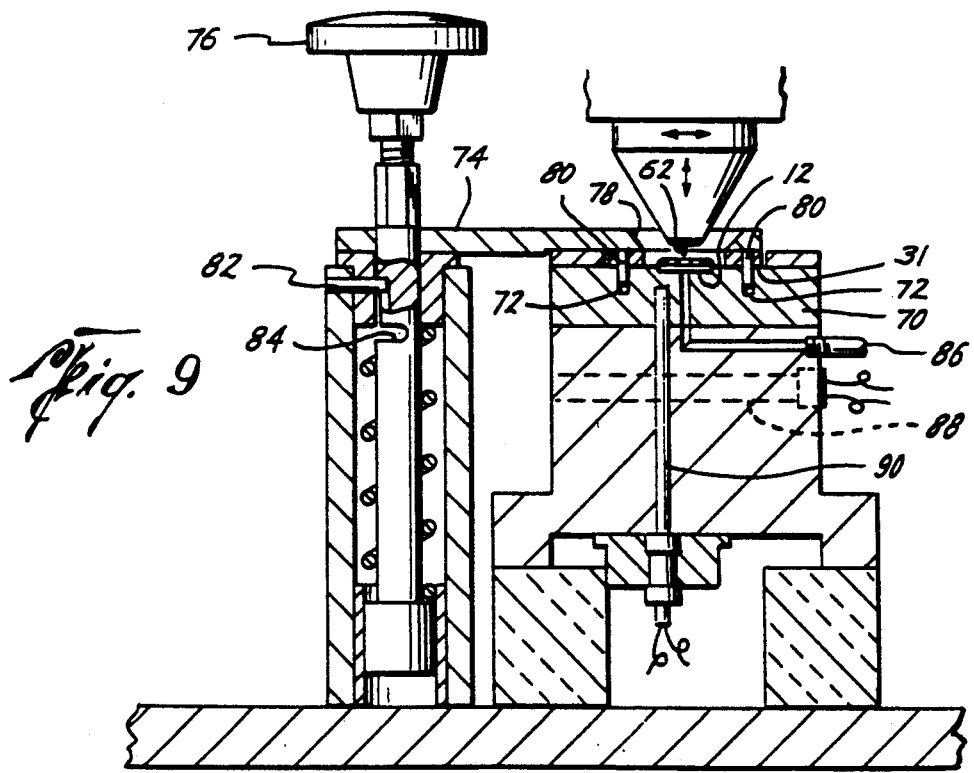
FIG. 9 is a cross-sectional view taken along the line 9—9 of FIG. 8.

Referring now to FIGS. 8 and 9, the 35 mm. tape 31 moves through the track 38 carrying the ILB'ed chips 12 into the dispensing station 34 which positions the tape over a base stage 70. The alignment of the chip 12 in the X and Y axis is achieved through the use of the sprocket holes 33 along the edge of the tape 31. The designated sprocket holes are visually centered over alignment holes 72 in the die stage 70 by the operator. An alignment arm 74 is movable both rotationally and vertically by means of a knob 76. The alignment arm 74 includes a window 78 for allowing dispensing the encapsulant onto the chip 12 and also includes pawls 80 which pass through the sprocket holes 33 of the tape 31 into the alignment holes 72. The alignment arm 74 may be moved by the knob 76 manually which releases the locking pin 82 from the slot 84. Thus, as best seen in FIG. 8, the alignment arm 74 may be raised and moved to the dotted position to allow movement of the tape 31 along the track to bring an uncovered chip into alignment with the holes 72 and under the robot arm. Thereafter, the alignment arm 74 is moved back to the position shown in solid outline in FIGS. 8 and 9 for aligning the chip 12 correctly in the X and Y directions.

As best seen in FIG. 9, the base stage 70 includes a vacuum suction line 86 leading to the underside of a chip 12 positioned properly in the X and Y directions. The vacuum draws the chip 12 flush downwardly with the die stage 70 in order to properly position the chip 12 in the Z direction relative to the dispensing needle 62 as will be more fully discussed hereinafter.

In order to dispense a highly viscous material as a thin semi-planar coating, various ways of reducing the viscosity of the encapsulant to improve its flow characteristics were considered. It is known that by heating the encapsulant a significant decrease in viscosity is provided. However, a main disadvantage of heating the encapsulant material is decreasing the pot life. For example, heating the Ablebond epoxy to 40° C. shortened the process pot life of the material by about 80% which was unacceptable. Instead, the flow of the encapsulant was improved by heating the chip 12 prior to dispensing the encapsulant thereon. The encapsulant is then heated as it contacts the warm surface of the chip, which decreases its viscosity and improves the flow and planarization characteristics of the coating before gel. Since the encapsulant is immediately gelled, reduction of pot life after dispense is not an issue, as it was for encapsulant heating prior to dispense.

Referring again to FIG. 9, the heated stage 70, to which the chip 12 was aligned, is provided with preferably two heaters 88 mounted in the stage 70 just below the surface where the chip 12 rests. A thermo-couple 90 is mounted in the stage 70 just below the surface where the chip 12 rests. Preferably, for the Ablebond epoxy, the temperature of the stage 70 is set at 125° C. In actuality, the temperature at the surface of the chip 12 is about 110° C. when dispensation begins. If the temperature of the stage 70 is set below 75° C., the flow characteristics are not adequately improved for the established base line process for the Ablebond epoxy; the lines of the dispensed pattern do not wet together, resulting in a non-planar final coat.

Figure 12:
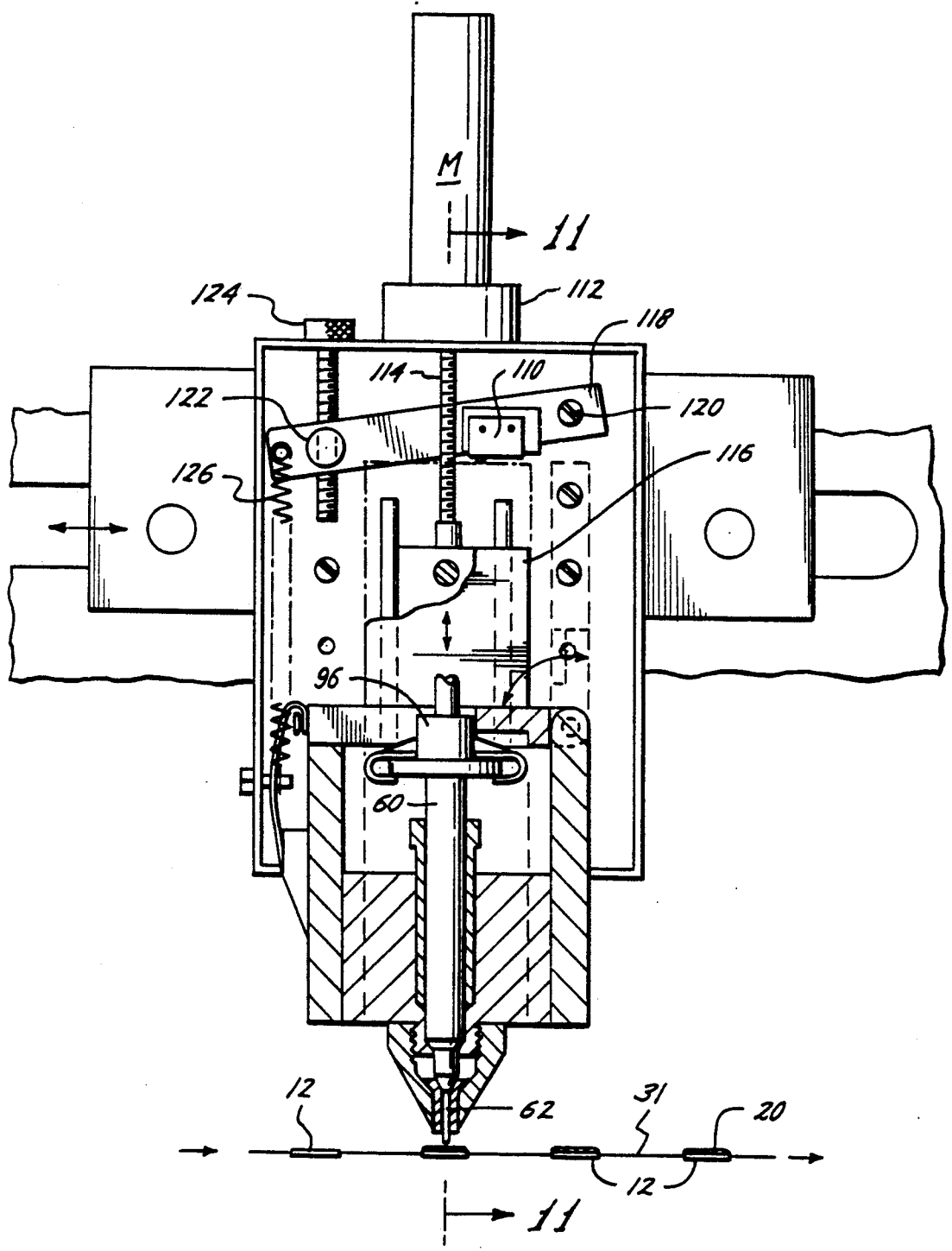
FIG. 12 is a cross-sectional view taken along the line 12—12 of FIG. 11.

Referring now to FIGS. 11 and 12, a pressure fitting 96 is attached to the top of the syringe 60 for applying pressure into the syringe 60 and forcing the encapsulant through the dispense needle 62. The pressure is controlled by the controller 64 (FIG. 2). The pressure setting required to achieve the desired average 3 to 6 mil coating varies with the flow characteristics or viscosity of the encapsulant material.

Preferably, the syringes 60 are prefilled with the encapsulant, but it has been found that the flow characteristics of the encapsulant may vary for each syringe of material. Therefore, a different pressure setting may be required for each syringe of material. Therefore, the parameter of pressure remains a variable in the established baseline process. Since a variable is not desirable, a simple technique that could be performed by the setup operator, in less than five minutes, is provided for determining the pressure for each syringe so that the process is viable for a manufacturing environment.

First, a trial and error method is utilized to determine pressure for the particular encapsulant used. The pressure is set at a trial value, then the encapsulation program run, the coating gelled, and finally the thickness of the coating measured. The steps are repeated until the correct pressure is found which produced the desired coating thickness. This method is not feasible for a process which is in production as it is very time-consuming and wasteful. However, the results of the trial and error method are used to develop the graph in FIG. 4 or a mathematical equation to establish the relationship between the weight of encapsulant dispensed and the dispensed pressure. Any value between the lines 100 and 102 is satisfactory.

Figure 4:
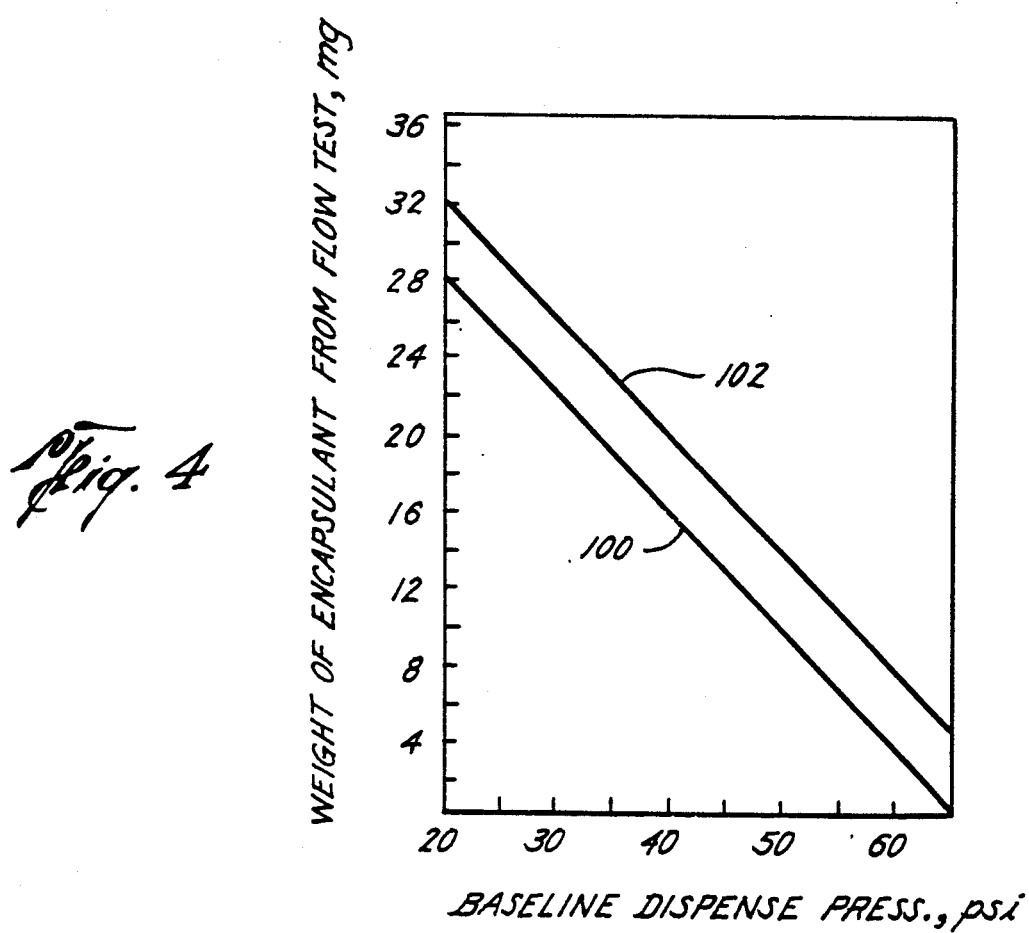
FIG. 4 is an example of a graph used to determine the dispense pressure of the encapsulant.
Figure 6:
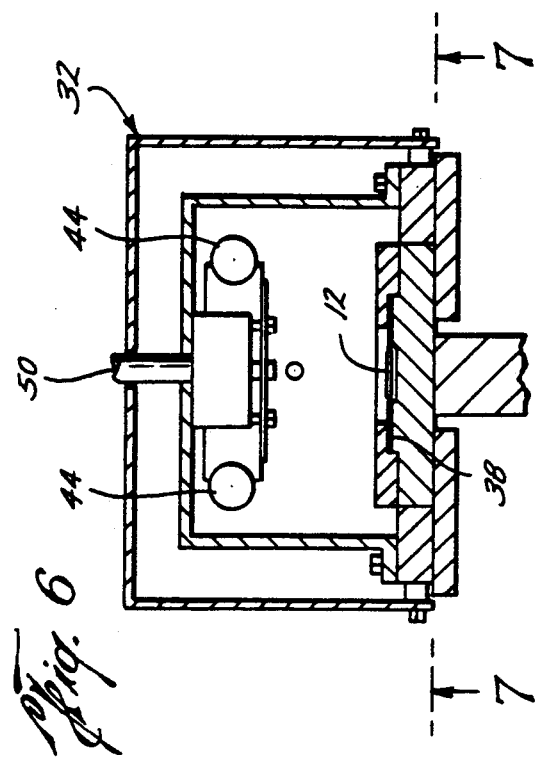
FIG. 6 is a cross-sectional view taken along the line 6—6 of FIG. 2.
Figure 7:
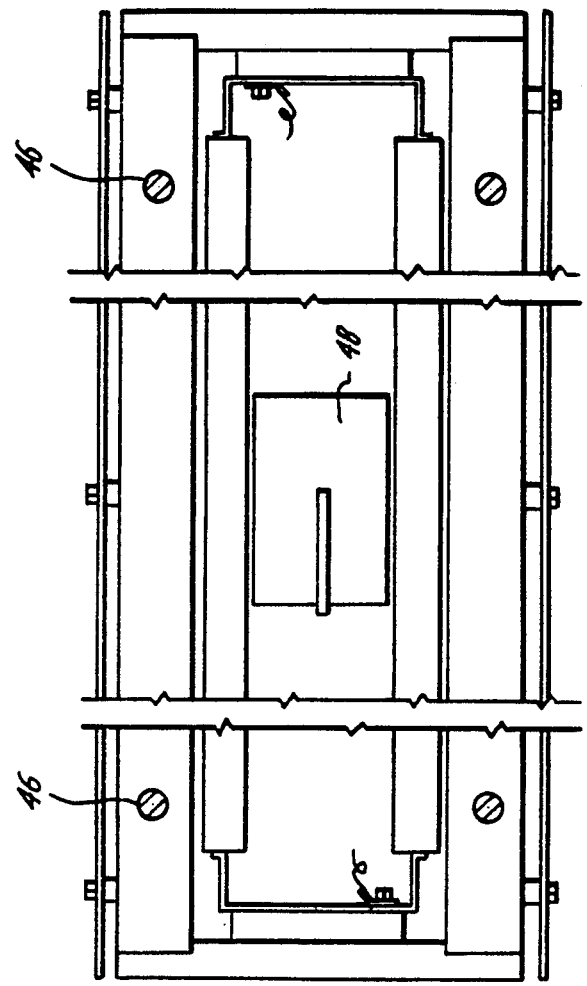
FIG. 7 is a cross-sectional view taken along the line 7—7 of FIG. 6.
Figure 5:
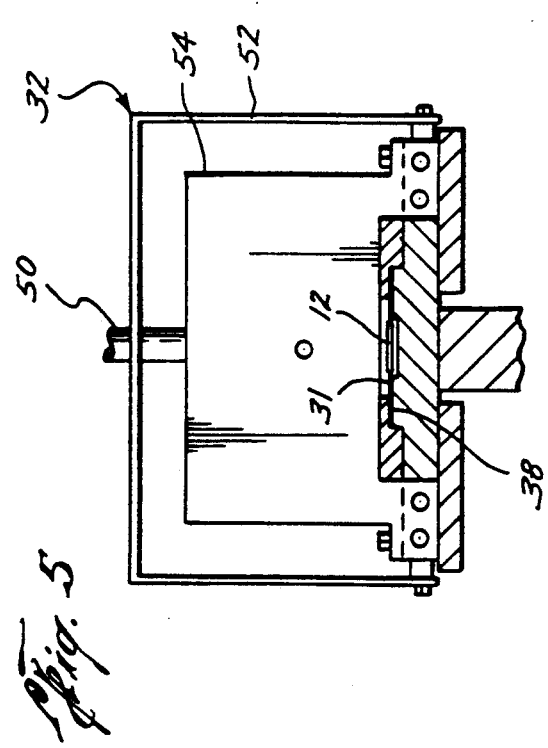
FIG. 5 is a cross-sectional view taken along the line 5—5 of FIG. 2.

The graph shown in FIG. 4 is specific to the Ablebond 69-5 epoxy. For other encapsulants a different graph would have to be provided.

A pressure dispensed technique was selected over the commonly used volume dispense method for several reasons. The volume dispense method utilizes a precision valve to control the total volume of material dispensed for "glob" top applications. Pressure dispense allows a control rate or quantity of material to be placed along each line of the pattern as a function of the needle size and speed. This quantity of material is varied by both the pressure used to displace the material, and the flow characteristics or viscosity of the material. The total volume of material dispensed is not significant, instead the resulting thickness and planarity of coating is critical. For example, the fact that twice as much material would be dispensed for a 6 mil coating versus the 3 mil coating is not a concern as long as the planarity is within 1.5 mils, since the average coating thickness is within the desired range of 3 to 6 mils.

The volume dispense method would guarantee dispension of a total controlled volume of material. For a given dispense pattern, as the viscosity of the material varied, the resulting thickness and planarity of the coating would be unacceptable using this technique.

The second reason a pressure dispense is selected over a volume or piston displacement technique is to mimimize costly, inadequately cleaned parts. An inexpensive, disposable plastic syringe and dispense needle are implemented and thus the material never comes in contact with any parts of the encapsulation system, thus no messy cleanup or flushing are required, and no expensive non-disposable parts are lost after the material has built up and cured within a small precision volume dispense chamber.

In order to determine the pressure required for a given syringe of material, a "flow test" is performed. The flow test determines the flow characteristics of the encapsulant using the weight measurement of the material which is dispensed under standard conditions for a specified period of time. A silicon blank is weighed and a test pattern is dispensed onto the blank. The encapsulant weight is subtracted from the original weight of the blank thereby providing the resulting "flow weight". Using this measured "flow weight", the graph in FIG. 4 is consulted and the pressure is determined from that graph which will produce the desired thickness. For example, if the measured "flow weight" is 16 mg., the dispensed pressure would then be set between 39 and 45 psi. Since the viscosity of the encapsulant varies significantly between lots of materials and as the material ages, the present process uses a test to indirectly measure the viscosity and account for the variations by adjusting the dispense pressure.

Another parameter is the inner diameter of the dispense needle 62. This diameter is an important factor in determining the quantity of material which is dispensed along each line of the dispense pattern. Changing the inner diameter results in significant changes in the coating thickness. Preferably, in the baseline process for the Ablebond epoxy, the preferred diameter was 10 mils, although a range from about 10 to 20 mils is satisfactory. One of the factors limiting the minimum dispense diameter is not the viscosity of the material, but the size of any filler particles used in the encapsulant. For example, the 25 gauge needle (inner diameter of 10 mils) utilized for the Ablebond 69-5 epoxy could not be used for some other types of epoxy materials because of frequent needle clogging. In these instances, due to larger filler particles, the larger gauge needle is used.

Figure 3:
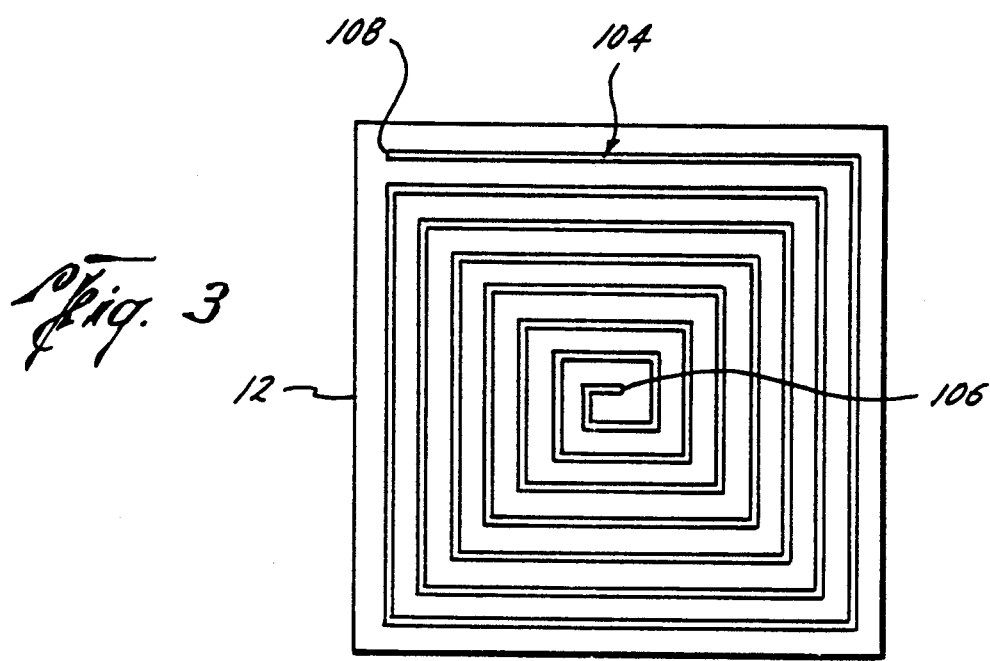
FIG. 3 is a top elevational view of the preferred dispense pattern of the encapsulant onto the top of the electrical device.

The encapsulant material cannot be globbed onto the center of the chip 12 and achieve the goal of a thin semi-planar coating 20. Instead, thin lines of material are laid onto the surface of the chip 12, which flow together forming an evenly-distributed thin coating across any size chip. There are several aspects of the dispense pattern which determine the final thickness and coverage of the coating. These aspects include the pattern, pattern spacing, and initial coordinates. The concentric pattern, as best seen in FIG. 3, provided a pattern 104 consisting of a plurality of concentrically equally spaced lines in which the pattern originated in the center at end 106 and spiraled outwardly to the outer end 108. This pattern was optimal based upon the planarity profile and consistent coverage along the perimeter of the chip 12. Other types of pattern were acceptable, though harder to control. An unacceptable pattern involved reversing the pattern and starting at the end 108 and ending at the end 106, resulted in a profile with a high centerpoint.

Another important aspect of the dispense pattern is the spacing between adjacent concentric lines for a specified needle orifice diameter. Initially the spacing was set at 20 mils for a 10 mil orifice which produced a questionable surface planarity even though the thickness was in the target range. This spacing did not allow the material to flow together or planarize between the individual pattern lines, leaving a very distinct pattern in the surface of the coating. In additional tests, the preferable spacing pattern was 10 mils for a 10 mil orifice although acceptable results were obtained in the range from about 6 mils to 14 mils. Generally, the spacing is substantially equal to the inner diameter of the needle.

Therefore, the preferred dispense program begins at the center of the chip 12 and a concentric pattern is generated with 10 mil spacing between lines to within 10 to 20 mils of the perimeter of the chip 12. The final loop of the pattern 104 is placed with the inner diameter of the dispense needle 62 aligned over each edge of the chip 12 by a mil or two. The acceptable pattern spacing is increased as needle's orifice diameter increases.

While the planarity of the encapsulant coating is controlled by the dispense pattern and pattern spacing as discussed, another important parameter determining the overall planarity is the speed of the dispense needle 62 as it travels along each loop of the defined dispense pattern 104 in the X and Y directions. The speed is varied as the X and Y axis motors decelerate and accelerate when changing travel directions causing a high spot to be formed in the center where the pattern lines are short and/or incomplete coverage along the perimeter of the chip 12 where the pattern lines are long. This effect can be overcome by varying the speed of the travel by increasing the speed at the center of the chip and decreasing the speed around the perimeter of the chip. Using the variations of speed available from the controller 64, of about 3.3 inches per second maximum at the center to the minimum of 0.4 inches per second along the perimeter, a satisfactory planarity was obtained.

Complete surface coverage is essential for optimum protection of the chip 12. Initially inspection of the cured encapsulated device 12 indicated the material was pulling away from the outer corners during gel. Although the needle 62 decelerates and accelerates as it changes direction, this time frame did not allow for dispensation of enough material to fill and remain in the corner areas after gel. Therefore, the needle 62 was stopped at the corners along the perimeter to provide a dwell time of 75 ms. at the four outer corners which provided the desirable corner coverage for the device and TAB tape design which was tested. This parameter is dependent upon the distance of the bumps 18 from the edge of the chip 12 and the spacing of the tape leads 16 from the corner of the chip 12.

The Z-height parameter is another important parameter which must be controlled. The term "Z-height" refers to the distance between the bottom tip of the dispense needle 62 and the top surface of the chip 12. If the tip 62 is too close to the chip 12, physical damage to the bonds or passivation layer occurs. If the dispense tip 62 is too far from the chip, continuous lines of encapsulant will not be placed on the chip 12, but rather discrete blobs of material will break off creating a non-planar coating with incomplete coverage. Difference in the Z height occurs because of the differences in the length of the needle 62 which were found to vary up to 50 mils, and each time a needle and syringe is loaded into the apparatus, its positional accuracy can vary by several mils. An acceptable base line Z-height is 10 mils and experimental findings indicate that a distance of substantially no greater than 15 mils is the maximum acceptable distance for the Ablebond epoxy. Because of the many factors contributing to the variable of the Z-height distance, the controller 64 was modified to allow for the physical adjustment of the Z-axis microswitch and a fixture provides a reference plane.

Referring now to FIGS. 8, 10, 11 and 12, the controller 64 (FIG. 2) utilizes a microswitch 110 to locate the home position in the Z axis. As noted in FIG. 12, a Z axis motor 112 operates a screw 114 to raise and lower an attachment plate 116 for holding the syringe 60. Actuation of the microswitch 110 by the plate 116 determines the home position of the needle 62 in the Z direction. However, the Z position of the microswitch 110 can be physically adjusted. That is, the microswitch 110 is connected to a bar 118 pivoting around a bolt 120 at one end. The second end of the bar 118 is connected to a threaded insert 122 which is threadedly connected to an adjustment screw 124. The second end of the bar 118 is also connected to a spring 126. Therefore, adjustment of the screw 124 changes the Z position of the microswitch 110.

Referring now to FIGS. 8 and 10, an alignment fixture generally indicated by the reference numeral 130 is provided and included a spring-loaded plate 132, connected to a dial gauge 134, which is used as the reference Z-plane for alignment. An alignment step is run each time a new syringe 60 is loaded into the holder. The dispense needle 62 is moved a fixed distance in the Z plane above the plate 132. For correct alignment, the dispense needle 62 should contact the plate 132 and push it downwardly until the dial gauge 134 is reading 0 mils plus or minus 0.5 mil. If the end of the needle 62 is not correctly aligned, the Z axis microswitch 110 is mechanically adjusted by the screw 124 (FIG. 12) and the alignment program is rerun for verification.

After the chip 12 has been covered with the liquid encapsulant at the dispense station 34, it moves to the gel station 36. The purpose of the gel station is to partially polymerize the epoxy encapsulant to allow subsequent reeling or stacking of the devices for complete cure in an oven. Adequate gelling is achieved when the coating is tack-free and won't deform upon subsequent handling. The gelling of the selected encapsulant is time and temperature dependent. A short gel time, preferably less than 10 minutes, at gel temperature is desired. The gel station 36 is basically the same structure as the preheat station 32 but possesses separate heating and nitrogen controls. For the Abelbond 69-5 epoxy, each of the devices 10 is gelled for 8 minutes at a gel temperature above 120° C. which provided satisfactory gel time.

The final cure cycle of the process is the cycle recommended by the vendor of the material. The cure cycle for the Abelbond 69-5 epoxy is 100° C. for 2 hours plus 150° C. for ½ hour. The encapsulated chip 12 on the tape 31 is reeled upon the reel 40 and is cured in any suitable oven.

After the parameters of the process were determined, a base line process was established. Referring now to FIG. 13, the summary of the baseline process parameter settings is listed except for the dispense pressure which must be determined for each new supply of dispensing encapsulant. The baseline parameters were established by individual experiments in which a single parameter was varied while all the other parameters were held at their ideal baseline values. However, these results produced limited knowledge of the process window since they do not take into consideration the interactions between the parameters.

Therefore, a matrix experiment was generated which held the process independent variables constant, while taking the dependent parameter variations into consideration. The independent process variables include pattern design 12, needle orifice diameter (10 mils), and encapsulant material (Ablebond 69-5 epoxy), while the parameters which display significant interaction or dependency include dispense pressure, chip stage temperature, dispense pattern spacing between lines, and Z-height. The dependent variables settings were reevaluated and modified slightly for each independent variable change, such as evaluation of various materials. The dependent parameter variations and the result of this experiment are shown in FIG. 14. Not all combinations of parameter variations produce desirable encapsulant coatings in this experiment. For example, a decrease of the dispense pattern spacing to 6 mils produced extremely thick coatings, except when the pressure also was decreased by 10 psi. Combining a decrease of 10 psi and pressure from the ideal setting, with an increase in pattern spacing or an increase in Z-height distance produced undesirably thin coatings with unacceptable coverage. In addition, an increase of 10 psi in pressure from the ideal setting resulted in coatings above the desirable thickness, except when the pattern spacing was increased.

Therefore, the present apparatus and process allows dispensing a highly viscous solventless liquid encapsulant as a thin semi-planar coating in which the encapsulant does not require heating before dispense, the process provides for tight control of the dispense coating thickness and planarity, provides complete covering of the corners of the chip with the encapsulant, defines the important parameters of the process, and provides a coating in which the test results indicated that the coating maintained or enhanced the performance of the chip with no degradation resulting from the coating.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts, and steps of the process, will be readily apparent to those skilled in the art, and which are encompassed within the spirit of the invention and the scope of the appended claims.

What is claimed is:

1. An apparatus for encapsulating the top of an electrical device in a tape comprising, a track for movably carrying said tape, a preheat station over the track for removing moisture from the device, an encapsulation dispensing station downstream from the preheat station, said encapsulation station includes, a heater positioned below the track for heating an electrical device placed thereon for reducing the viscosity of applied encapsulant, a pressure actuated epoxy dispenser positioned above the heater and above the track and means for moving said dispenser in a continuous line and in a plurality of separated concentric lines for dispensing a liquid epoxy encapsulant onto the top of an electrical device positioned on the heater, and a gel station downstream from the encapsulation station for heating and solidifying the dispensed epoxy.

2. The apparatus of claim 1 wherein the dispenser is movable relative to the top of the electrical device in a concentric movement from the center to the perimeter of the top.

3. The apparatus of claim 1 wherein the needle has an inner diameter of about 10 to 20 mils, the dispenser spaces the lines substantially equal to said inner diameter, and the distance of the bottom of the needle from the top of the electrical device is no greater than about 15 mils.

4. The apparatus of claim 1 wherein the speed of the dispenser relative to the top decreases from the center to the perimeter.

5. The apparatus of claim 1 wherein the movement of the dispenser relative to the top of the electrical device stops at the corners of the top.

6. The apparatus of claim 1 wherein the pressure of the dispenser ranges from about 20 psi to about 65 psi and is increased in response to increasing viscosity of the epoxy.

7. In an apparatus for encapsulating the top of an electrical device having a preheat station for removing moisture from the device, a heater for heating the electrical device for reducing the viscosity of applied encapsulant, and a gel station for heating and solidifying the dispensed encapsulant, the improvement in an encapsulation dispensing station positioned between the preheat station and the gel station for uniformly coating the top of the electrical device, comprising, a pressure actuated epoxy dispenser, and means for moving said dispenser relative to the top of the electrical device in a concentric movement from the center to the perimeter of the top for dispensing a liquid epoxy encapsulant in a continuous line forming a plurality of separated concentric lines onto the top of the electrical device.

8. The apparatus of claim 7 wherein the speed of the dispenser relative to the top decreases from the center to the perimeter.

9. The apparatus of claim 7 wherein the movement of the dispenser relative to the top of the electrical device stops at the corners of the top.

10. The apparatus of claim 7 wherein the needle has an inner diameter of about 10 to 20 mils, the dispenser spaces the lines substantially equal to said inner diameter, and the distance of the bottom of the needle from the top of the electrical device is no greater than about 15 mils.

* * * * *